United States Patent [19]
Zhang et al.

[11] Patent Number: 5,620,811
[45] Date of Patent: Apr. 15, 1997

[54] LITHIUM POLYMER ELECTROCHEMICAL CELLS

[75] Inventors: Jinshan Zhang, Coral Springs; Ganesh Venugopal, Plantation; Anaba Anani, Lauderhill, all of Fla.

[73] Assignee: Motorola, Inc., Schaumburg, Ill.

[21] Appl. No.: 452,935

[22] Filed: May 30, 1995

[51] Int. Cl.$^6$ .............. H01M 6/16; H01M 6/14; H01M 4/62; H01M 4/50
[52] U.S. Cl. .............. 429/192; 429/194; 429/217; 429/218; 429/223; 429/224
[58] Field of Search .............. 429/192, 194, 429/218, 223, 224, 217

[56] References Cited

U.S. PATENT DOCUMENTS

| | | | |
|---|---|---|---|
| 4,302,518 | 11/1981 | Goodenough et al. | 429/104 |
| 4,357,215 | 11/1982 | Goodenough et al. | 204/2.1 |
| 5,162,170 | 11/1992 | Miyabayashi et al. | 429/218 X |
| 5,176,969 | 1/1993 | Miyabayashi et al. | 429/218 X |
| 5,296,318 | 3/1994 | Gozdz | 429/192 |
| 5,368,959 | 11/1994 | Koksbang | 429/218 X |
| 5,429,890 | 9/1995 | Pynenburg et al. | 429/192 |
| 5,478,672 | 12/1995 | Mitate | 429/194 |
| 5,501,921 | 3/1996 | Olsen | 429/192 |

OTHER PUBLICATIONS

Poly(Dimethylsiloxane)–Poly(Ethylene Oxide) Based Polyurethane Networks Used as Electrolytes . . . 15(1985), 233–240 North–Holland, Amsterdam by A. Bouridah, et al Apr. 11, 1983.

Ionic Conductivity of Polyether . . . Macromolecules, 1984, 17, 63–66 by Killis, et al.

Mechanism High Ionic Conductivity in Elastomeric Networks, Journal of Power Sources, 9(1983) 389–395 by Gandini, et al.

Polyaniline/Polyurethane, $LiClO_4$ Conducting Polymer Composite British Polymer Journal 23 (1990) 151–155, 1990, by Yi–Rui, et al.

Carbonxylate and Sulfonate Polyaddition Polymers, Polymer Research Laboratories, NHK Spring Company, Ltd. Dept. of Research, Yokohama, Japan.

Cycloaliphatic Epoxide–Base Photocured Gelled Electrolytes for Secondary Lithium Battery Applications . . . Nagasubramanian, et al, J. Electrochem Soc. vol. 141, No. 6, Jun. 1994.

*Primary Examiner*—Donald R. Valentine
*Attorney, Agent, or Firm*—Kenneth M. Massaroni

[57] ABSTRACT

A secondary lithium electrochemical charge storage device, such as a battery (10) is taught. The battery (10) includes a first composite electrode (20), and electrolyte layer (40), and a second composite electrode (30). The composite electrodes include at least an active material, and a polymer or polymer blend for lending ionic conductivity and mechanical strength. The electrolyte may also include a polymer as well as an electrolyte active material. The polymer from which the composite electrode is fabricated may be the same as or different than the polymer from which the electrolyte layer is fabricated.

27 Claims, 4 Drawing Sheets

LITHIUM POLYMER ELECTROCHEMICAL CELLS

TECHNICAL FIELD

This invention relates in general to secondary lithium electrochemical cells and more particularly to lithium batteries having composite electrodes.

BACKGROUND OF THE INVENTION

Secondary lithium electrochemical cells, and particularly lithium batteries, using an intercalation compound as the positive electrode have been studied intensively during the past decade. Heretofore, the cathode material used in these batteries was typically a lithiated cobalt oxide, nickel oxide, or manganese oxide. The earliest reports of rechargeable lithium batteries occurred more than a decade ago, and are shown in, for example, U.S. Pat. Nos. 4,302,518 and 4,357,215 to Goodenough, et al.

Secondary lithium batteries using polymer electrolytes offer substantial advantages over lithium ion batteries with liquid electrolytes as are currently known in the field. Among these advantages are enhanced safety, long-cycle life, high energy density, and flexibility. Most of all, secondary lithium batteries using polymer electrolyte holds great promise to be manufactured with ease, since thin film processes in the polymer industry can be used or adapted to the production of secondary lithium batteries. One of the key issues in making secondary lithium polymer batteries is the preparation of composite electrodes which possess good mechanical strength and high conductivity, both in terms of ionic conductivity and electronic conductivity. High conductivity, both ionic and electronic, is essential for high rate operation of the lithium battery. Good mechanical strength is also necessary for large scale processing.

Composite electrodes used in secondary lithium polymer batteries typically contain an electrode material providing active mass and polymer electrolyte providing mechanical integrity and ionic conductivity. The polymer electrolyte used in the composite electrodes of the prior art are identical to the polymer used in the electrolyte layer of the device, and have, heretofore been fabricated of, for example, poly(ethylene oxide) or poly(vinylidene fluoride).

Examples of this electrochemical device configuration can be found in, for example, U.S. Pat. No. 5,296,318 to Gozdz, et al., in which poly(vinylidene fluoride) copolymer was used in the composite electrode and as the electrolyte layer. Other polymers which were used in the same fashion include polyethylene oxide and poly(acrylonitrile).

These devices, while acceptable, did not demonstrate the high levels of ionic conductivity and the high performance rate characteristics required to make lithium polymer batteries successful in the marketplace. Moreover, due to inherent limitations with the polymer itself, mechanical integrity, and hence cycle life of the material were compromised.

Accordingly, there exists a need for a method of preparing composite electrodes, having high ionic and electronic conductivity, as well as mechanical strength which enables easy and inexpensive production of secondary lithium polymer batteries.

DETAILED DESCRIPTION OF THE PREFERRED EMBODIMENT

Figure 1:
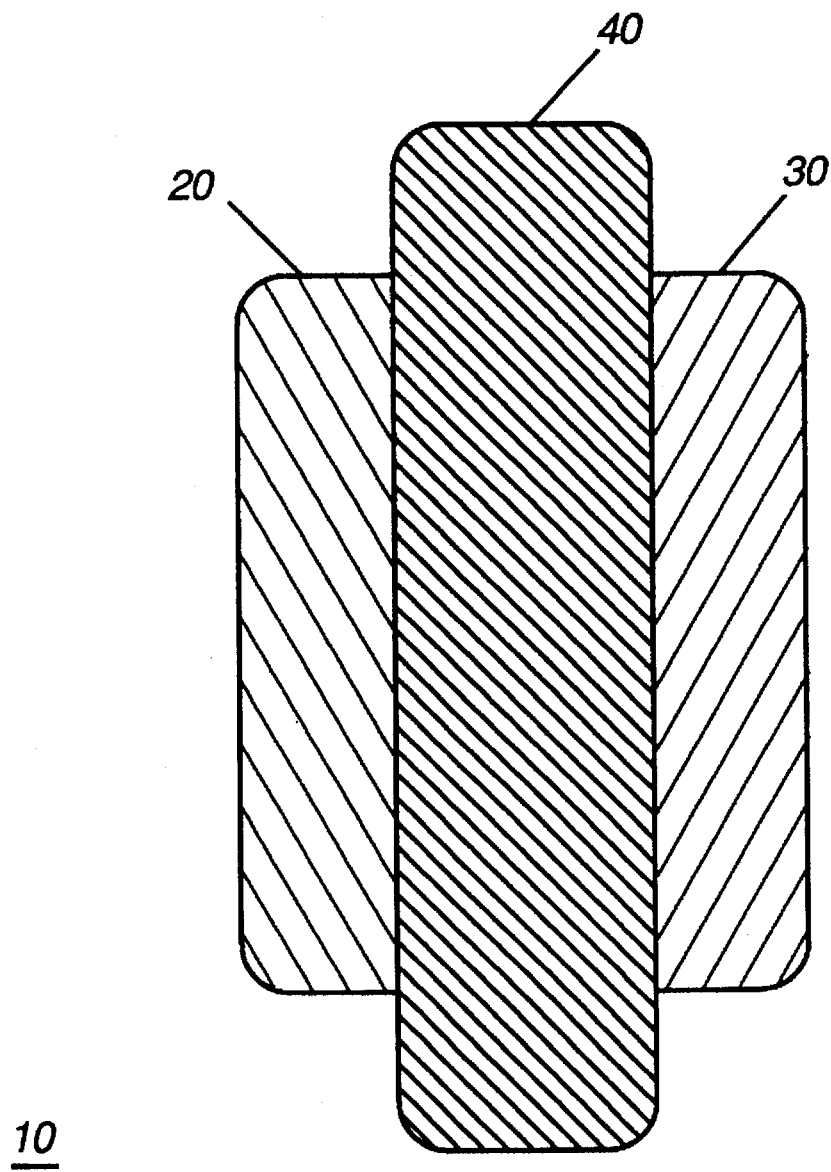
FIG. 1 is a representation of an electrochemical cell including a composite electrode in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a representation of an electrochemical cell 10 including a composite electrode in accordance with the instant invention. The electrochemical cell includes a positive electrode 20 and a negative electrode 30 and a polymer electrolyte 40 disposed between said electrodes. Either one of, or both, electrodes 20 and 30 may be composite electrodes as are taught herein. As used herein and as is generally accepted in the industry, a composite electrode refers to an electrode which includes at least an electrode active material as well as a polymeric material which serves as both binder and to improve conductivity.

Using this definition of a composite electrode, a first electrode, such as the positive electrode 20 or cathode may be fabricated including a electrode active material selected from the group of $LiCoO_2$, $LiMnO_2$, $LiNiO_2$, $V_6O_{13}$, $V_2O_5$, and combinations thereof. The polymeric material used may be either a single polymer or a blend of polymers which provide the desired mechanical strength and high ionic conductivity. The polymer may be selected from the group of, but not limited to, polyesters, polyethers, poly(urethane), poly(ethyloxide), poly(vinylidine fluoride), poly(acrylonitrile), poly(tetrafluoroethylene), and combinations thereof. In this regard, and in a first preferred embodiment, the polymer used in the composite electrode is poly(tetrafluoroethylene). In another preferred embodiment, the polymer used in the composite electrode is a polymer blend which comprises at least about 90% poly(urethane) and the balance being poly(vinylidene fluoride). In a composite electrode, the polymer or polymer blend may comprise up to 60% of the composite electrode, and typically comprises between five and forty percent of the composite electrode.

The composite electrode, in this case, the positive electrode 20 may further include or be wetted with a liquid electrolyte, such as that used in polymer electrolyte 40. In one preferred embodiment, the liquid electrolyte is a solution of a lithium salt, or a combination of salts, dissolved in an aprotic organic solvent, or combination of solvents. Lithium salts include, but are not limited to, salts, having the formula $Li^+X^-$, where $X^-$ is an anion such as $Cl^-$, $Br^-$, $I^-$, $ClO_4^-$, $BF_4^-$, $PF_5^-$, $AsF_6^-$, $CH_3CO_2^-$, $CF_3SO_3^-$, $(CF_3SO_2)_2N^-$, $(CF_3SO_2)_{3C}^-$. Aprotic organic solvents include, but are not limited to, propylene carbonate ("PC"), ethylene carbonate ("EC"), diethyl carbonate, dimethyl carbonate, dipropyl carbonate, dimethyl sulfoxide, acrylonitrile, and combinations thereof.

A second electrode, such as negative electrode 30 or anode of the cell 10 may also be fabricated as a composite electrode. In this case, the composite electrode forming negative electrode 30 includes a polymer or polymer blend as described hereinabove with respect to electrode 20. The composite electrode 30 further includes a negative electrode active material selected from the group of materials consisting of carbon, activated carbon, graphite, petroleum coke, lithium alloys, such as LiAl, low voltage lithium intercalation compounds, such as $TiS_2$ and $MoS_2$ and combinations thereof. Once again, the polymer or polymer blend comprises between 5 and 40 percent of the total electrode.

Disposed between the positive and negative electrodes is the polymer electrolyte 40 which consists of a polymer matrix and an electrolyte active material. The electrolyte active material may be a liquid species such as that described hereinabove, and includes, in one preferred embodiment, EC, PC, and $LiBF_4$. The material from which the polymer matrix is fabricated may likewise be selected from the polymer materials described hereinabove with respect to the first and second composite electrodes. In one preferred embodiment of the instant invention, the first composite electrode is fabricated of an appropriate active material and a polymer. The first composite electrode polymer in this preferred embodiment is poly(tetrafluoroethylene), while the polymer matrix from which the electrolyte layer is fabricated is of a different polymer material. Hence, the polymer used in the electrolyte matrix may be, for example, poly(urethane). Thereafter, the second composite electrode may be fabricated so as to have a polymer material either different than or the same as the polymer from which the electrolyte layer is fabricated. Thus, in constructing a lithium polymer secondary battery in accordance with the instant invention, the polymer used in the composite electrode is different than that used in the electrolyte. This is in sharp contrast to the prior art in which the polymer used is the same for both electrolyte and the composite electrode.

It thus may be appreciated that in an electrochemical cell, such as a secondary lithium battery, fabricated according to this invention, the polymer used in the first electrode may be different than that used in the electrolyte. The polymer used in the second electrode may likewise be different than both the first electrode and the electrolyte. Alternatively, it may be the same as either the first electrode or the electrolyte.

Alternatively, at least the first electrode and the electrolyte may be fabricated so as to have a similar or the same polymer, if that polymer is poly(urethane). The use of poly(urethane) as the electrolyte polymer is disclosed in U.S. patent application Ser. No. 08/279,131, filed Jul. 22, 1991, now U.S. Pat. No. 5,549,987 in the names of Venugopal, et al, and assigned of record to Motorola, Inc., the disclosure of which is incorporated herein by reference.

Accordingly, a cell may be manufactured with a poly(urethane) composite first electrode and a poly(urethane) electrolyte layer. The second electrode may also be a composite electrode, and as such may also be fabricated with a poly(urethane) polymer incorporated therein.

The instant invention may be better understood from the perusal of the examples which follow hereinbelow.

EXAMPLES

Example I

A first composite cathode was fabricated by mixing 90 parts of $LiMnO_2$, an electrode material, with 10 parts of carbon black, a conductivity enhancing material. To this mixture was added 100 parts of a poly(urethane) electrolyte solution. The poly(urethane) electrolyte solution contained 1 part of poly(urethane), 4 parts of 1M $LiBF_4$ solution in an equal parts mixture of PC/EC, and 95 parts of tetrahydrofuran. Also added was 5 parts of poly(vinylidene fluoride) which was added to the composite cathode to enhance the mechanical strength of the film. The mixture was well blended and pressed into a composite cathode pellet at 100° C. under 10,000 pounds of pressure. The resulting composite electrode contained 80 wt % of active mass of $LiMnO_2$,.

A three-electrode electrochemical cell was constructed with the $LiMnO_2$ composite film as cathode, metallic lithium as counter and reference electrode and a poly(urethane) gel film containing 2 parts of poly(urethane) and 8 parts of the 1M $LiBF_4$ PC/EC solution as electrolyte. The initial discharge capacity obtained for the $LiMnO_2$ composite cathode fabricated according to this Example I was 104 mAh/g.

Figure 2:
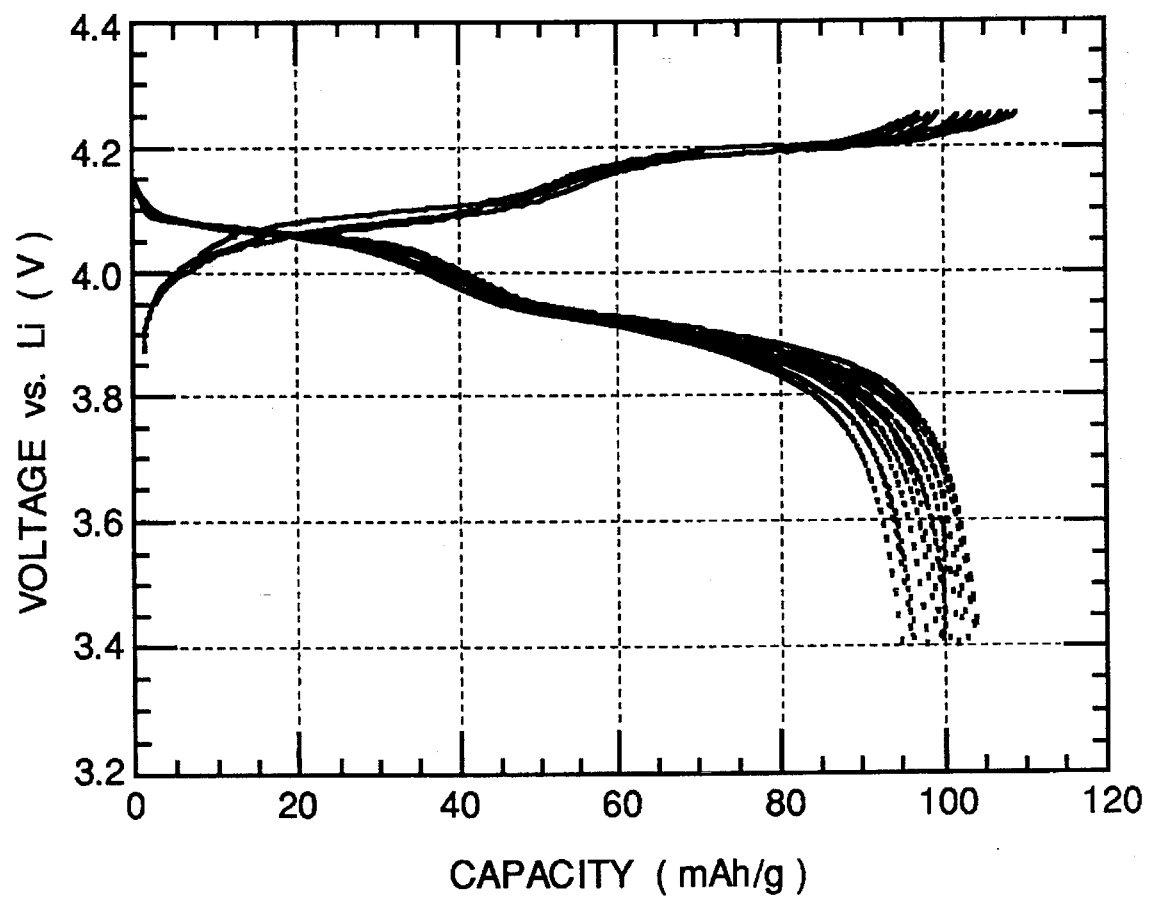
FIG. 2 is a charge/discharge profile of a half cell reaction employing a composite electrode cycled between 3.40 and 4.25 volts in accordance with the instant invention.

Referring now to FIG. 2, there is illustrated therein the charge/discharge profile for the composite electrode described in this example. The electrode was cycled between about 3.4 and 4.25 volts with a current density of about 0.2 $A/cm^2$. As may be appreciated from a perusal of FIG. 2, the first 15 cycles of the cell were illustrated and demonstrate the efficacy of the composite cathode fabricated according to this Example I.

Example II

A mixture of 45 parts of $LiMnO_2$, 5 parts of carbon black and 4 parts of the poly(urethane) electrolyte solution described in Example I was stirred at ambient temperatures for about four hours. The resulting slurry was then poured onto a substrate sheet, specifically a piece of Kapton, and cast into a thin film. After approximately 15 minutes at ambient temperature, a thin film was formed as a result of tetrahydrofuran evaporation. The film so fabricated had a thickness of between 25 to 50 microns, though it is to be understood that other thicknesses could be made by changing viscosity of the slurry before casting, or by hot pressing multiple layers of the thin film after casting at approximately 100° C. The composite cathode was then soaked in a liquid electrolyte of 1M $LiBF_4$ solution in an equal parts mixture of PC/EC for 1 hour at ambient temperature. The composite cathode gained approximately 30% weight in the process due to absorption of the liquid electrolyte. The composite cathode film made according to this Example II demonstrated a rubbery characteristic with high mechanical integrity. The conductivity of the composite film was measured to be approximately $10^{-3}$ S/cm.

Figure 3:
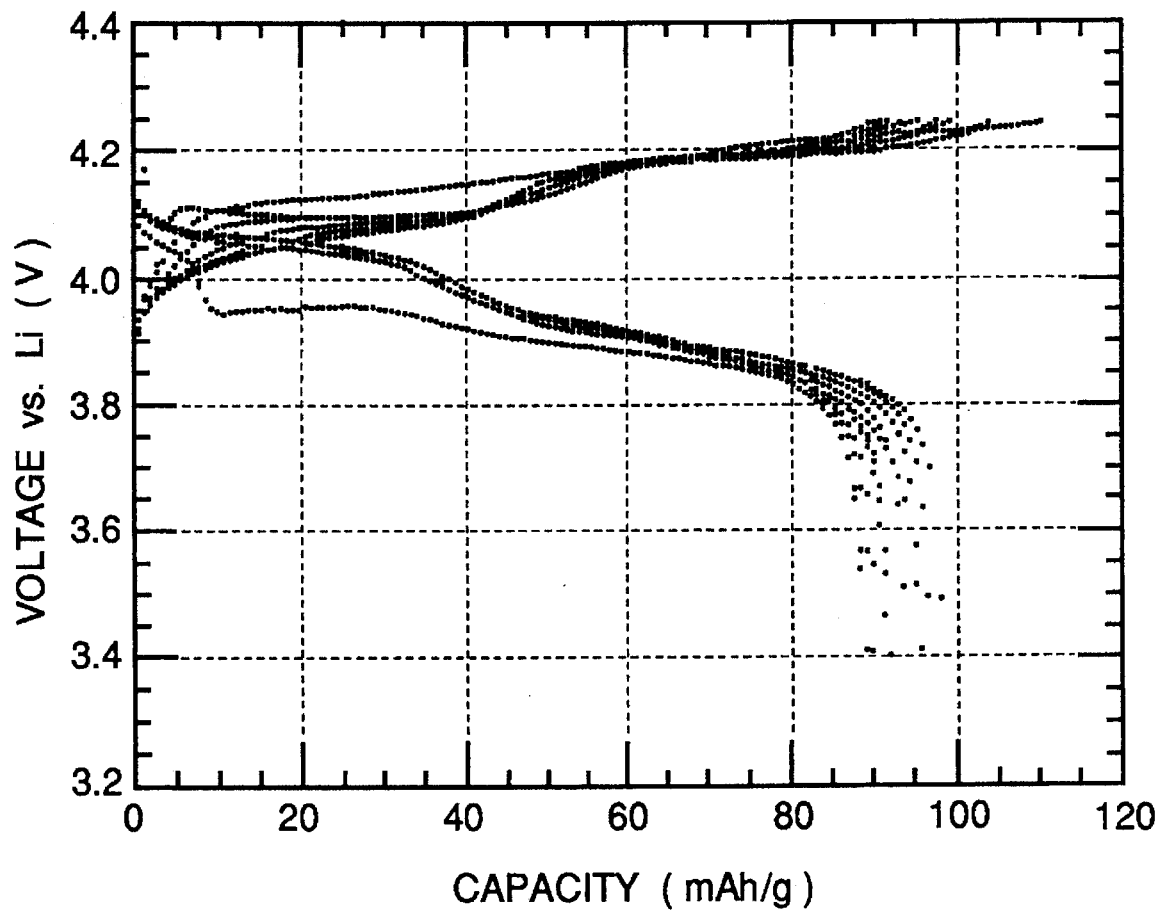
FIG. 3 illustrates the charge/discharge profile of a half cell using a composite electrode in accordance with the instant invention.

A piece of the composite film was used as cathode in a three-electrode electrochemical cell with metallic lithium as counter and reference electrode, and a poly(urethane) gel film as electrolyte. The initial discharge capacity obtained for the $Li_2MnO_4$ composite cathode fabricated according to this Example II was 100 mAh/g. Referring now to FIG. 3, there is illustrated therein the charge/discharge profile for a composite electrode in accordance with this invention. As may be appreciated from a perusal of FIG. 3, the first 15 cycles of the cell were illustrated and demonstrate the efficacy of the composite cathode fabricated according to this Example II. Specifically, the electrode was cycled between about 3.4 and 4.25 volts with a current density of about 0.2 $A/cm^2$. The electrode showed relatively good capacity, about 95 mAh/g, without substantial capacity fade over the test.

Example III

Figure 4:
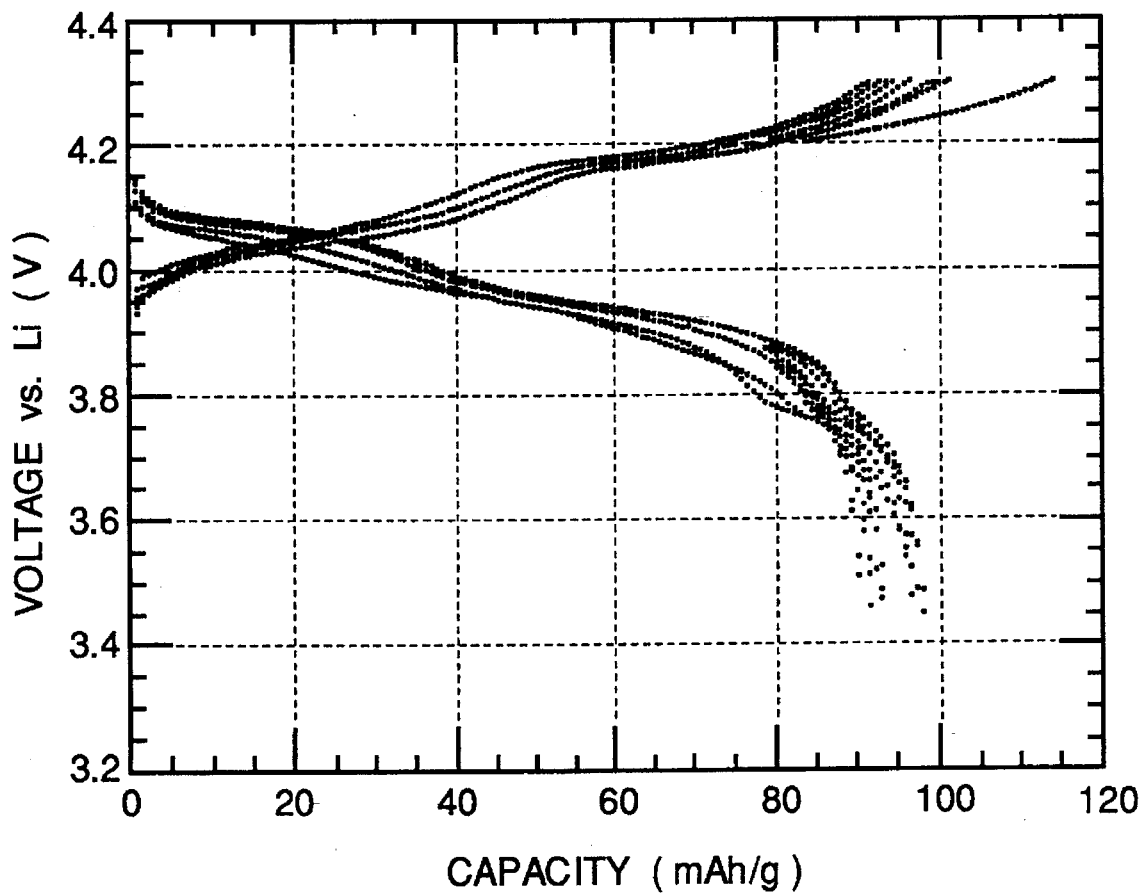
FIG. 4 shows the charge and discharge profile of a half-cell using a composite electrode in accordance with the instant invention.

A composite cathode was fabricated using 85 parts of $LiMnO_2$, 10 parts of carbon black, and 5 parts of poly(tetrafluoroethylene). The polymer used herein did not include poly(urethane) or any other polymer. Upon continuous grounding in a mortar, the well-blended mixture of $LiMnO_2$, carbon black and poly(tetrafluoroethylene) formed a rubbery film. The film could be made thinner using a conventional roller assembly. The thickness of the film was adjusted by how much force was applied to, and how many times the film was passed through the roller assembly. The resulting film did not include electrolyte active material incorporated therein. The cathode film was paired with a thin film of the poly(urethane) gel electrolyte and assembled into a three-electrode electrochemical cell as described hereinabove in Example I. Referring now to FIG. 4, there is illustrated therein the charge/discharge profile of the composite $LiMnO_2$, cathode cycled against the lithium anode. The initial capacity of the $LiMnO_2$ electrode was 110 mAh/g. The electrode was cycled between about 3.4 and 4.25 volts, with a current density of about 0.2 $A/cm^2$. As may be appreciated from FIG. 4, the electrode demonstrated good capacity without performance degradation over the test. The result was deemed surprising by the inventors because the composite electrode did not contain electrolyte active material as is common in the prior art.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A lithium polymer secondary electrochemical cell comprising:
   a first composite electrode including an electrode active material and a first polymer, said polymer being poly(tetrafluoroethylene);
   a polymer electrolyte including an electrolyte active material and a second polymer different than said first polymer, said second polymer being poly(urethane); and
   a second electrode.

2. A lithium polymer secondary electrochemical cell as in claim 1, wherein said first composite electrode active material is selected from the group consisting of $LiCoO_2$, $LiNiO_2$, $LiMnO_2$, $V_6O_{13}$, $V_2O_5$, and combinations thereof.

3. A lithium polymer secondary electrochemical cell as in claim 1, wherein said electrolyte active material is a liquid electrolyte.

4. A lithium polymer secondary electrochemical cell as in claim 4, wherein said liquid electrolyte is a solution of a lithium salt dissolved in an aprotic organic solvent.

5. A lithium polymer secondary electrochemical cell as in claim 1, wherein said second electrode is a composite electrode including an electrode active material and a third polymer, said third polymer being different than at least one of said first polymer or said second polymer.

6. A lithium polymer secondary electrochemical cell as in claim 5, wherein said second composite electrode active material is selected from the group of carbon, activated carbon, graphite, lithium alloys and combinations thereof.

7. A lithium polymer secondary electrochemical cell as in claim 5, wherein said third polymer is poly(tetrafluoroethylene).

8. A lithium polymer secondary electrochemical cell as in claim 1, wherein said first polymer is a polymer blend of at least two polymers.

9. A lithium polymer secondary electrochemical cell as in claim 8, wherein said polymer blend includes at least poly(urethane) or polyvinylidene fluoride, or poly(tetrafluoroethylene).

10. A lithium polymer secondary electrochemical cell as in claim 8, wherein said polymer blend includes poly(urethane) and poly(vinylidene fluoride).

11. A lithium polymer secondary electrochemical cell comprising:
    a first composite electrode including an electrode active material selected from the group of $LiCoO_2$, $LiNiO_2$, $LiMnO_2$, $V_6O_{13}$, $V_2O_5$, and combinations thereof, and a first polymer consisting of poly(tetrafluoroethylene);
    a polymer electrolyte including a liquid electrolyte solution comprising a lithium salt dissolved in an aprotic organic solvent, and a second polymer including at least poly(urethane); and
    a second composite electrode including a second composite electrode active material and a third polymer, said third polymer being different than at least one of said first polymer or said second polymer.

12. A lithium polymer secondary electrochemical cell as in claim 11, wherein said second composite electrode active material is selected from the group of carbon, activated carbon, graphite, lithium alloys and combinations thereof.

13. A lithium polymer secondary electrochemical cell as in claim 11, wherein said third polymer is poly(tetrafluoroethylene).

14. A lithium polymer secondary electrochemical cell comprising:
    a first composite electrode including an electrode active material selected from the group of $LiCoO_2$, $LiNiO_2$, $LiMnO_2$, $V_6O_{13}$, $V_2O_5$, and combinations thereof, and a first polymer consisting of poly(urethane);
    a polymer electrolyte including a liquid electrolyte solution comprising a lithium salt dissolved in an aprotic organic solvent, and a second polymer including at least poly(urethane); and
    a second composite electrode, including a second composite electrode active material and a third polymer, including at least poly(urethane).

15. A lithium polymer secondary electrochemical cell as in claim 14, wherein said second composite electrode active material is selected from the group of carbon, activated carbon, graphite, lithium alloys and combinations thereof.

16. A lithium polymer secondary electrochemical cell as in claim 14, wherein said third polymer further includes poly(tetrafluoroethylene).

17. A lithium polymer secondary electrochemical cell comprising:
    a first composite electrode including an electrode active material and a first polymer;
    a polymer electrolyte including an electrolyte active material and a second polymer different than said first polymer; and
    a second composite electrode including an electrode active material and a third polymer, said third polymer being different than at least one of said first polymer or said second polymer.

18. A lithium polymer secondary electrochemical cell as in claim 17, wherein said first composite electrode active material is selected from the group consisting of $LiCoO_2$, $LiNiO_2$, $LiMnO_2$, $V_6O_{13}$, $V_2O_5$, and combinations thereof.

19. A lithium polymer secondary electrochemical cell as in claim 17, wherein said first polymer is poly(tetrafluoroethylene).

20. A lithium polymer secondary electrochemical cell as in claim 17, wherein said electrolyte active material is a liquid electrolyte.

21. A lithium polymer secondary electrochemical cell as in claim 20, wherein said liquid electrolyte is a solution of a lithium salt dissolved in an aprotic organic solvent.

22. A lithium polymer secondary electrochemical cell as in claim 17, wherein said second polymer is poly(urethane).

23. A lithium polymer secondary electrochemical cell as in claim 12, wherein said second composite electrode active material is selected from the group of carbon, activated carbon, graphite, lithium alloys and combinations thereof.

24. A lithium polymer secondary electrochemical cell as in claim 17, wherein said third polymer is poly(tetrafluoroethylene).

25. A lithium polymer secondary electrochemical cell as in claim 17, wherein said first polymer is a polymer blend of at least two polymers.

26. A lithium polymer secondary electrochemical cell as in claim 25, wherein said polymer blend includes at least poly(urethane) or polyvinylidene fluoride, or poly(tetrafluoroethylene).

27. A lithium polymer secondary electrochemical cell as in claim 25, wherein said polymer blend includes poly(urethane) and poly(vinylidene fluoride).

* * * * *